US006665542B1

(12) United States Patent
Clancy

(10) Patent No.: US 6,665,542 B1
(45) Date of Patent: Dec. 16, 2003

(54) SYSTEM AND METHOD FOR CUMULATIVE CLUTTER PATH LOSS

(75) Inventor: James G. Clancy, Plano, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 363 days.

(21) Appl. No.: 09/656,596

(22) Filed: Sep. 7, 2000

(51) Int. Cl.[7] .................................................. H04B 7/01
(52) U.S. Cl. .................... 455/504; 455/65; 455/67.6
(58) Field of Search .......................... 455/67.6, 67.7, 455/67.1, 65, 504, 506, 446

(56) References Cited

U.S. PATENT DOCUMENTS 5,491,644 A * 2/1996 Pickering et al. .......... 455/67.6
5,890,076 A    3/1999 Takano et al.
5,963,867 A * 10/1999 Reynolds et al. .......... 455/67.6

FOREIGN PATENT DOCUMENTS

GB          2 311 912 A   10/1997
WO      WO 98 27763 A      6/1998

* cited by examiner

Primary Examiner—Lee Nguyen

(57) ABSTRACT

A method and system of determining the cumulative clutter path loss between two points within a coverage area (30) of a telecommunications network. The coverage area of the network is divided into a geographical matrix of bins (31). For each bin in the matrix, a clutter value is assigned indicating the appropriate losses a signal experiences as it propagates through the bin. The clutter values of bins (31) in the matrix are added along a radial (21) connecting the two points to determine a cumulative clutter path loss between a transmitter and a receiver, such as a base station (20) and mobile handset (28).

27 Claims, 5 Drawing Sheets

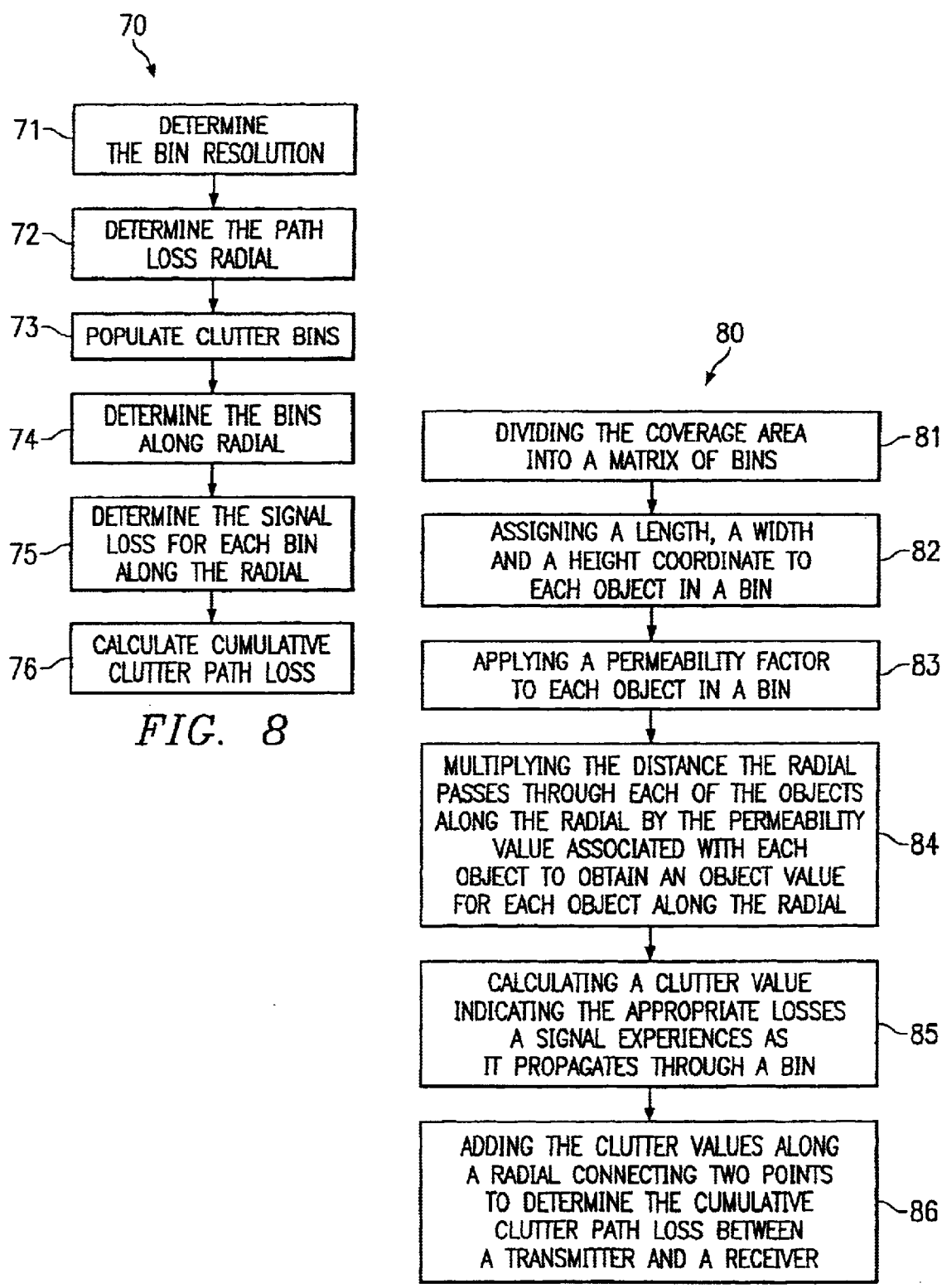

SYSTEM AND METHOD FOR CUMULATIVE CLUTTER PATH LOSS

TECHNICAL FIELD

This invention relates in general to wireless telecommunications networks and applications and, in particular, to a method and system of optimizing the signal strength of the network. More particularly, the invention relates to methods of determining cumulative clutter path loss between two points within the network.

BACKGROUND OF THE INVENTION

Without limiting the scope of the invention, its background is described in connection with a wireless telecommunications network utilizing a matrix of bins to predict clutter signal losses in order to determine appropriate power levels, as an example.

Present-day mobile telephony has spurred rapid technological advances in both wireless and wireline communications. The wireless industry, in particular, is a rapidly growing industry, with advances, improvements, and technological breakthroughs occurring on an almost daily basis. Many mobile or wireless telecommunications systems, among them the European GSM-system, have passed through several generations of advancements and development phases. System designers are now concentrating on further improvements to such systems, including system refinements and the introduction of optional subscriber services.

Most wireless telecommunications systems are implemented as cellular telephone networks wherein a group of Base Transceiver Stations (BTSs), or base stations are served by a centrally located switch. The switch is commonly referred to as a Mobile Switching Center (MSC). The base stations are spaced apart from each other by distances of between one-half and twenty kilometers. Each base station is assigned a number of two-way voice and control channels. The voice channels transmit voice signals to and from proximately located mobile handsets, and transmit control information to and from these mobile handsets, usually for the purpose of establishing a voice communications link.

Calls by mobile subscribers can be affected by interference or radio disturbance events which, in turn, limit the efficiency of the network. As such, it is important to identify those cells within the network, which are sources of and subject to radio disturbance events. Interference itself can be either external or internal to radio network. The internal interference results from call activities within a network. In this regard, it is appropriate to term the cells as either "offending" or "disturbed." Also, in this regard, a radio disturbance event typically occurs during a cellular call, either on the downlink (from a base station to a mobile handset) or on the uplink (from a mobile handset to a base station). The disturbance events include co-channel interference or adjacent channel interference. Similarly, different sources of external interference exist that can create problems in the network. Objects such as trees and buildings, for example, are known to those skilled in the art as "clutter". Clutter affects a signal as the signal propagates through the objects.

Presently, methods and systems exist for identifying "cluttered" areas within wireless telecommunications networks. Typically, in a wireless network, when a signal propagates between a base station and a mobile handset, it often has to pass through many objects between the base station and the mobile handset.

In one method, in order to account for clutter within the coverage area including the base station and the mobile handset, the coverage area is subdivided into clutter areas. Each clutter area is then assigned an average clutter value which represents the types of clutter found within that clutter area. The signal strength between the base station and the mobile handset is then adjusted based on the clutter value for the clutter area in which the mobile handset is located. Thus, the signal is adjusted to accommodate the change in signal strength only due to the clutter in that specific clutter area. If, for example, there are large objects creating significant clutter in clutter areas along the path between the base station and the mobile handset, the prior art techniques of identifying clutter would not correctly account for this additional clutter. The validity of such predictions are dependent on a number of factors, including the accuracy of the propagation model utilized and the resolution of the terrain data, for example.

Another prior art clutter technique involves the use of interference prediction tools, along with trial and error, and "drive-by" techniques to predict and measure the effects of changes in the radio network. These tools are useful in predicting where interference will effect the cellular system given a specific output power generated by the radio base station. The predictions are accurate only if the propagation model is accurate. The sources of interference can be identified, but again, the accuracy is a function of the propagation model. The drive-by methods, on the other hand, are quite accurate as they are based on clinical measurements, but require an immense amount of resources to implement.

Such tools are helpful in identifying the cells that have coverage and interference problems, but taken together are often inaccurate because of the dependence on predictions. That is, such prediction tools do not always account for "real-life" sources of interferences in the coverage area as determined through more empirical measurement methods.

While prior art techniques are useful in identifying, predicting and measuring the effects of coverage and interference in the network, they do not suggest how clutter in one part of the network can effect the performance in another part. What is needed is a method of optimizing the methods for determining the effects of clutter on signal strength in a wireless telecommunications network. A means for predicting clutter signal loss in the coverage area of a network would provide numerous advantages.

SUMMARY OF THE INVENTION

The present invention provides a method and system for optimizing signal strength and minimizing interference in a wireless telecommunications network. With the present invention, once the network operator has identified the sources of clutter, such information may be used in improving performance of the network. That is, the clutter in all of the bins between a transmitter and a receiver is accounted for in adjusting the signal strength between a transmitter and a receiver to determine the cumulative clutter path loss.

Disclosed in one embodiment is a method of determining the cumulative clutter path loss between two points within a coverage area in a telecommunications network. Initially, the coverage area is divided into a geographical matrix of bins. Each bin represents a subset of the coverage area. The size of the bin can vary and is dependent on the resolution needed to obtain an accurate clutter value along the path.

Once the coverage area is divided, a clutter value is assigned indicating the appropriate losses a signal experiences as it propagates through a bin. In one embodiment, the clutter value is assigned by taking an average value determined by drive testing a bin to determine an average signal loss value. In another embodiment, the clutter value is assigned based on the objects in the bin. In yet another embodiment, the clutter value is calculated for each object that the signal path crosses through as it propagates through the bin.

Finally, the clutter values for each bin along a radial connecting the transmitter and the receiver are added together to create a cumulative clutter path loss value. The cumulative clutter path loss value is used to adjust the signal strength between the transmitter and receiver to account for all the significant objects along the path.

In another embodiment of the invention, a system for determining a cumulative clutter path loss between two points within a coverage area of a network is disclosed. The system comprises a means for dividing the coverage area into a geographical matrix of bins. The bins are used to allow for a better resolution of signal loss over the coverage area. The system further comprises a means for assigning a clutter value to each bin. The clutter value indicates the appropriate losses a signal experiences as it propagates through a bin. The system also comprises a means for adding the clutter values of the bins along a radial connecting two points in order to determine the cumulative clutter path loss. The two points are represented by a transmitter and receiver. In one embodiment, the transmitter is a base station and the receiver is a mobile handset. In another embodiment, the transmitter is a mobile handset and the receiver is a base station.

Disclosed in another embodiment is a program product for optimizing the signal strength between two points by accounting for the cumulative clutter between the two points. The program product is typically a software program used for carrying out the steps of the invention. The program product comprises an instructional means for dividing the coverage area into a geographical matrix of bins and an instructional means for assigning a clutter value to each bin indicating the appropriate losses a signal would experience as it propagates through a bin. The program product further comprises an instructional means for adding the clutter values of the individual bins along a radial connecting two points together. The two points are typically a transmitter and a receiver. In one embodiment, a base station and a mobile handset will function as a transmitter and receiver, respectively.

A technical advantage of the present invention includes more accurate propagation predictions for coverage interference. As such, the propagation analysis takes into account the behavior of all clutter between two points within the network rather than only the clutter of the terminal bin.

Another technical advantage of the present invention is enabling radio network engineers to optimize the network with the objective of minimizing interference.

BRIEF DESCRIPTION OF THE DRAWINGS

For a more complete understanding of the present invention, including its features and advantages, reference is made to the following detailed description of the invention, taken in conjunction with the accompanying drawings of which:

FIG. 8 depicts a method for carrying out the steps, according to one embodiment of the present invention; and FIG. 9 depicts the steps for applying the permeability factor through objects along the radial to determine the path loss, according to one embodiment of the present invention.

Corresponding numerals and symbols in the figures refer to corresponding parts in the detailed description unless otherwise indicated.

DETAILED DESCRIPTION OF PREFERRED EMBODIMENTS

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
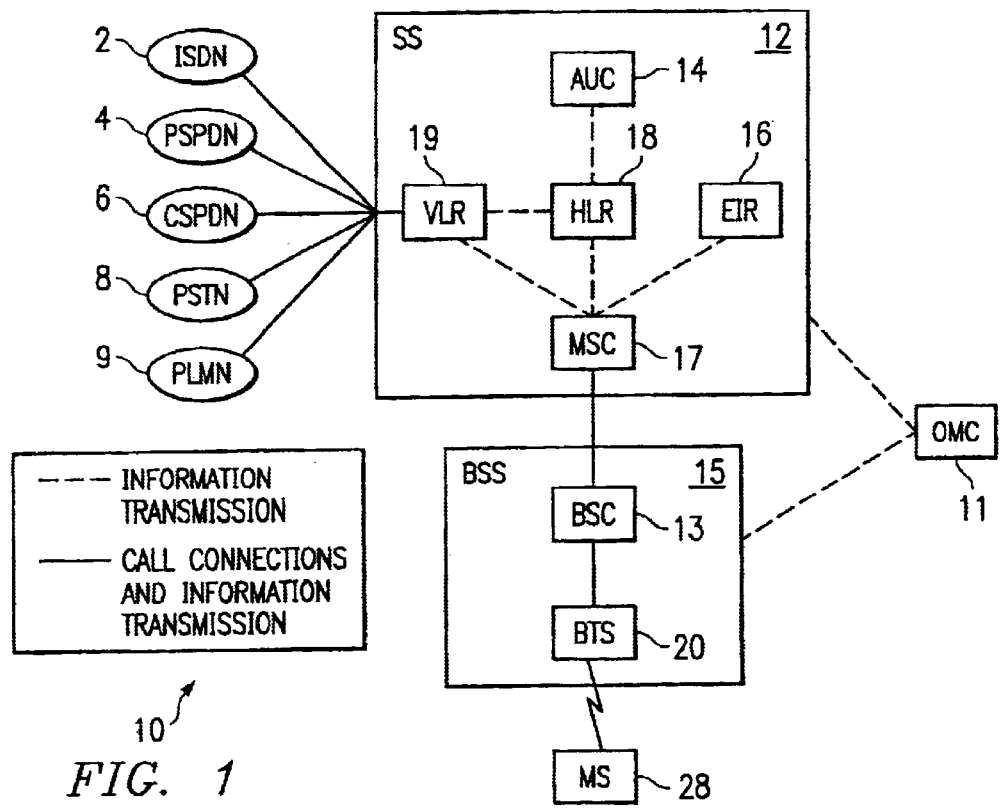
FIG. 1 depicts a telecommunications network in which a preferred embodiment of the present invention may be implemented.

To better understand the invention, reference is made to FIG. 1, wherein a diagram of a wireless telecommunications network, denoted generally as 10, in which a preferred embodiment of the present invention may be implemented is shown. Telecommunications network 10 includes a Switching System (SS) 12 and a Base Station System (BSS) 15. Each of these systems contains a number of functional units, which process information and carry out operations of a functional network 10. The functional units themselves may be implemented utilizing various telecommunication hardware devices.

The SS 12 includes a Visitor Location Register (VLR) 19, a Home Location Register (HLR) 18, an Authentication Center (AUC) 14, an Equipment Identity Register (EIR) 16, and a Mobile Switching Center (MSC) 17. The BSS 15 comprises a Base Station Controller (BSC) 13 and a Base Transceiver Station (BTS) 20. An Operations and Maintenance Center (OMC) 11 is connected to equipment present within SS 12 and to BSC 13. The dashed lines in FIG. 1 represent information transmission, while solid lines represent both call connections and information transmission.

Telecommunications network 10 illustrated in FIG. 1 may be realized as a network of neighboring radio cells, which together provide complete coverage for a service area. The service area is the geographic area served by a given telecommunications supplier and the area in which the supplier stands ready to provide its service. Those skilled in the art will appreciate that the terms "service area" and "coverage area" can be utilized interchangeably. Each cell contains a BTS 20 operating on a set of radio channels. These channels differ from the channels utilized by neighboring cells in order to avoid interference.

Each BSC 13 controls a group of BTSs 20. The BSC 13 controls well-known telecommunication functions, such as "Handover" and power control. A number of BSCs (e.g., BSC 13) are served by a MSC 17, which controls calls to and from a Public Switched Telephone Network (PSTN) 8. MSC 17 also controls calls to and from an Integrated Services Digital Network (ISDN) 2, a Public Land Mobile Network (PLMN) 9, a Circuit Switched Public Data Network (CSPDN) 6, and also, various private networks such as, a Packet Switched Public Data Network (PSPDN) 4.

Each unit is actively involved in carrying speech connections between the Mobile Handset (MS) 28 and, for example, a subscriber in a fixed network, such as PSTN 8. Because of the extreme difficulties involved in completing an MS 28 terminated telephone call, a number of databases located within the telecommunications network 10 keep track of the MS 28. The most important of these databases is the HLR 18. When a user subscribes to a wireless telecommunications network, such as the telecommunications network 10 depicted in FIG. 1, the user is registered within the HLR 18. The HLR 18 contains subscriber information, such as supplementary services and authentication parameters.

Data describing the location of the MS 28, such as the area (i.e., the MSC area) in which the MS 28 presently resides, is contained within the HLR 18. The MSC area represents that portion of the telecommunications network 10 covered by a single MSC 17. In order to route a call to a mobile subscriber within a telecommunications network, such as the telecommunications network 10 depicted in FIG. 1, the path through the network links to the MSC 17 in the MSC area where the subscriber is currently located. Data describing the location of the MS 28 is thus actively altered as the MS 28 moves from cell to cell within the telecommunications network 10. MS 28 sends location information, via MSC 17 and VLR 19, to an associated HLR 18, which permits MS 28 to receive calls. The AUC 14 is connected to HLR 18, and provides HLR 18 with authentication parameters and ciphering keys utilized for security purposes.

Furthermore, VLR 19 is a database that contains information regarding all mobile handsets currently located in the MSC area. When MS 28 roams in a new MSC area, the VLR 19 connected to the MSC 17 in that particular area requests data about the MS 28 from HLR 18. Simultaneously, HLR 18 is provided with the location of the MSC area in which MS 28 resides. If it is later desired to make a call from MS 28, VLR 19 will have at its disposal, all the information necessary for call set-up, without being forced to interrogate HLR 18 each time a call is initiated. The VLR 19 thus functions as a distributed HLR 18. As such, VLR 19 also contains precise information about the location of the MS 28 in the MSC area.

If an individual subscriber within the fixed network PSTN 8 desires to make a call to a subscriber, an exchange within PSTN 8 connects the call to an MSC 17 equipped with a function commonly known as a "gateway" function. In the telecommunications arts, a MSC 17 having a "gateway" function is commonly referred to as a Gateway MSC (GMSC). The MSC 17 in telecommunications network 10 of FIG. 1 may be implemented as a GMSC. Most MSC's within GSM telecommunications networks function as a GMSC. The GMSC must find the location of the searched MS 28, which can be accomplished by interrogating the HLR 18 where the MS 28 is registered. The HLR 18 then replies with the address of the current MSC area. Thereafter, the GMSC can re-route the call to the correct MSC 17. When the call reaches that MSC 17, the VLR 19 will have additional information regarding the precise location of the MS 28. The call can then be switched through to completion.

The telecommunications network 10 depicted in FIG. 1 may be implemented as a GSM-type network. Those skilled in the art can appreciate that although the present invention is described and illustrated in the context of a GSM network standard, the present invention may also be implemented in accordance with other standards and networks, including AMPS/TDMA utilized in North and South America. The GSM network standard, as discussed herein, is merely presented for illustrative purposes only and is not a limiting feature of the present invention.

Figure 2:
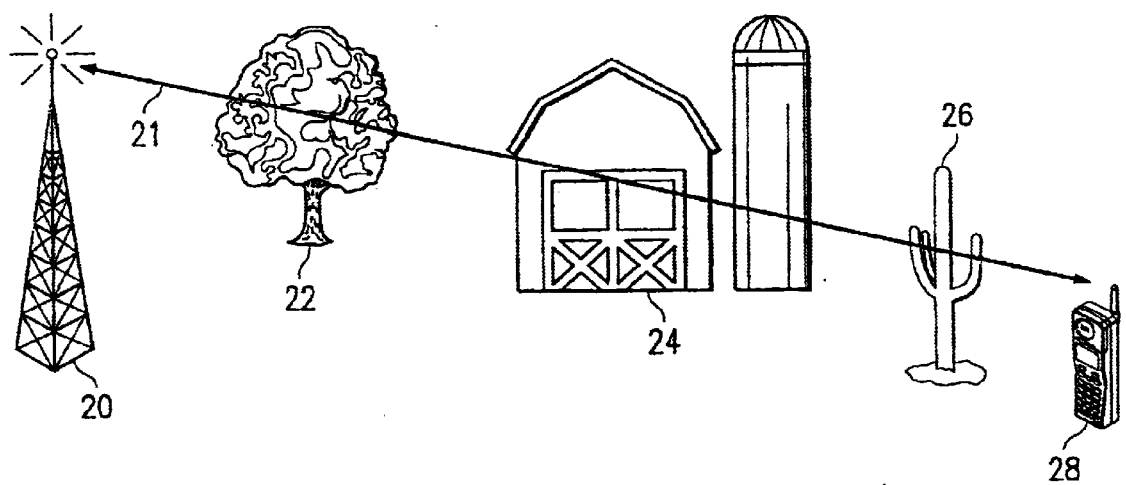
FIG. 2 illustrates a signal passing through clutter between a base station and a mobile handset, as described by one embodiment of the invention.

FIG. 2 is an illustration of a typical signal passing through several different types of clutter between a base station 20 and a mobile handset 28. As shown, the signal travels along radial 21 passing through a group of trees 22, a building 24, and a cactus 26, as examples. As the signal propagates between the base station 20 and the mobile handset 28, the signal strength is decreased by each object that it passes through. This type of signal loss is called "clutter". Clutter can be modeled in many different ways, but proper modeling is an important factor in determining the amount of signal adjustment that is needed for a successful connection between a base station 20 and a mobile handset 28. Those skilled in the art can appreciate that MS 28 and mobile handset 28 are identical to each other and the terms may be used interchangeably for the invention. Furthermore, BTS 20 and the base station 20 are identical to each other and the terms are used interchangeably for the invention.

Figure 3:
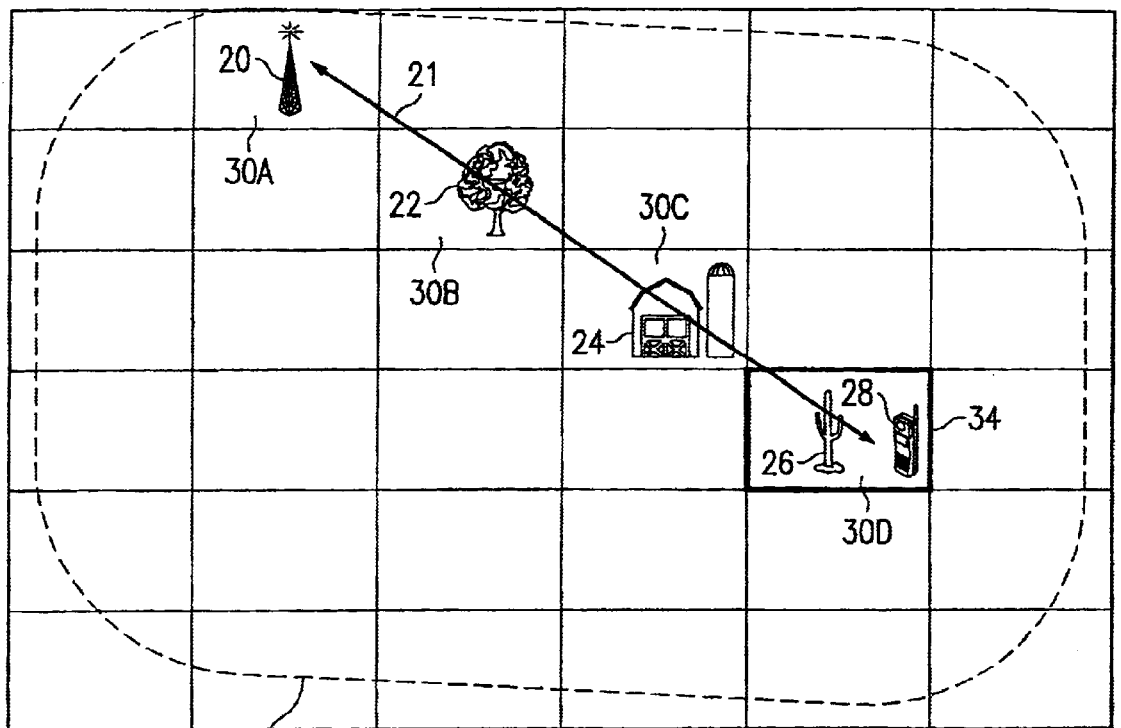
FIG. 3 depicts a signal traveling along a radial with only the terminating bin being used for a calculation, according to a prior art.

In FIG. 3, the prior art method of determining the change to the signal strength is shown. Coverage area 31 is divided up into a matrix of bins 30, each of which represents a small portion of the coverage area 31. In this example, a base station 20 is physically located within bin 30A and a mobile handset 28 is physically located in bin 30D. The signal passes through three clutter objects as it propagates between the base station 20 and the mobile handset 28. However, in one prior art method of signal adjustment, only the objects in bin 30D are taken into account. For example, if only the cactus 26 is used to adjust the signal strength for a signal traveling along the radial 21, a true accounting for all clutter along the radial is not provided.

Figure 4:
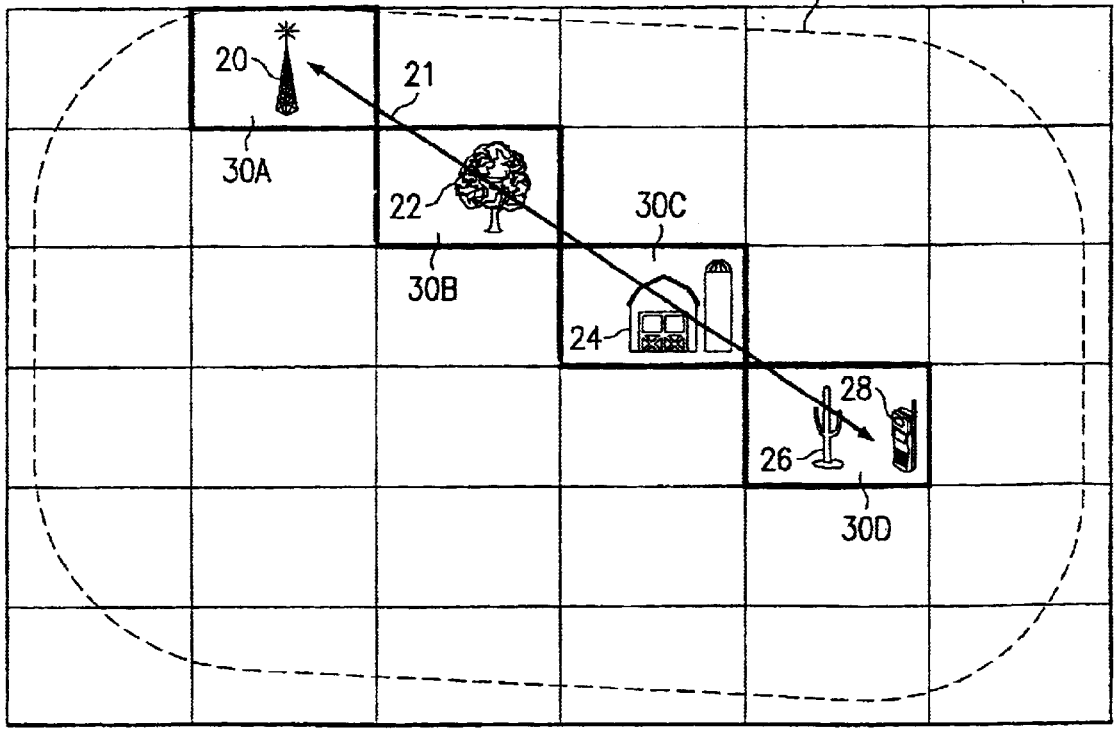
FIG. 4 illustrates a signal traveling along a radial between a base station and a mobile handset, according to one embodiment of the present invention.

FIG. 4 illustrates the cumulative clutter path loss method according to a preferred embodiment of the present invention. Coverage area 31 is divided into a matrix of bins 30. A base station 20 is situated in bin 30A. Bins 30B and 30C both contain objects causing clutter. For example, Bin 30B has a group of trees 22, while building 24 is situated in Bin 30C. Bin 30D has a mobile handset 28 and an object creating clutter, cactus 26. The signal between the base station 20 and the mobile handset 28 can be seen traveling along the radial 21 and passing through bins 30B, 30C and 30D. In each bin a clutter value is calculated by adding the object values of each individual object within each bin.

In the present invention, the clutter values for all three bins, 30B, 30C, and 30D, will be added together to create a cumulative clutter loss value used to calculate the Received Signal Loss (RSL). RSL represents the amount of loss or gain that the signal needs to be adjusted to maintain a proper signal strength between the base station 20 and the mobile handset 28. By adding the clutter values for each bin along the radial 21 instead of only looking at the terminal bin 30D, a more accurate estimate of clutter value and signal loss is derived. Since a more accurate RSL value is used, communications within the network are optimized and more efficiently routed between the base station 20 and the mobile handset 28. Accordingly, calls using mobile handsets 28 will suffer less interference and fewer dropped signals.

Additionally, each bin can be modeled utilizing very accurate information in order to allow for increased accuracy in estimating the clutter loss within a bin. Alternatively, because the clutter within a bin can be modeled more accurately, the size of the bins can be increased so that fewer calculations are needed to correctly estimate the signal strength needed for the communications between the base station 20 and the mobile handset 28.

Figure 5:
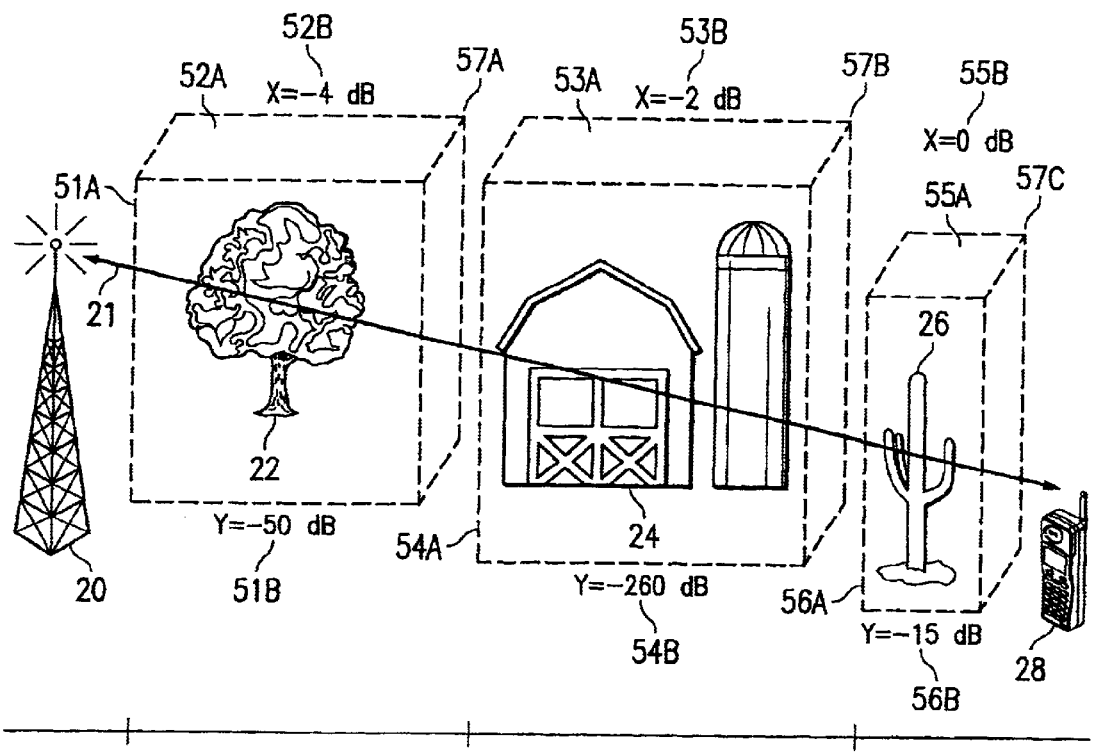
FIG. 5 depicts object clutter calculations based on assigning signal loss values to objects, according to one embodiment of the present invention.

With reference to FIG. 5, therein depicted is a method of calculating the clutter loss for objects within a bin. In order to model objects within a bin, coordinates are assigned to represent the length, the width and the height of objects, such as trees, buildings, and other obstructions. Lines depicting the coordinates are illustrated by cubes 57A, 57B, and 57C. These cubes 57A, 57B, and 57C are used to represent the objects within a bin. The group of trees 22 is modeled by the lines forming a cube shown as 57A. Objects coming through the side of the trees go through plane 51A. Plane 51A is assigned an object value of signal loss as indicated by Y=−50 decibels (dB) denoted as 51B.

Similarly, if a signal were to go through the cube from the top as denoted by 52A, the signal would see a decrease of strength of X=−4 dB as denoted by 52B. The building 24 is similarly outlined by cube 57B and has object values associated with signal loss passing through the side 54A of −260 dB 54B, and through the top 53A of −2 dB denoted by 53B. Similar to the group of trees 22 and the building 24, cactus 26 contributes to the signal loss experienced between base station 20 and mobile handset 28. Cactus 26 has signal loss through the top 55A denoted by X, which is equal to 0 decibels denoted by 55B. Cactus 26 has a signal loss through the plane denoted by 56A of Y=−15 dB denoted by 56B. As depicted in FIG. 5, an object value of signal loss is assigned to each object, then any signal that passes through that object has the applicable signal loss added to it.

Figure 6:
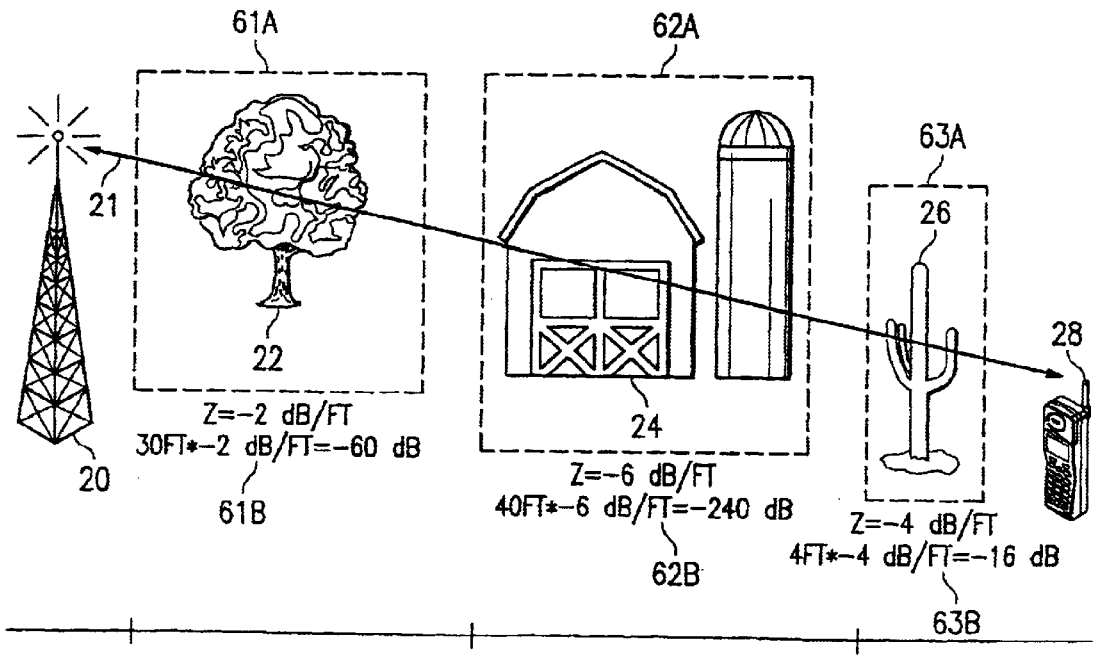
FIG. 6 depicts assigning signal loss permeability factors to objects along a signal path, according to one embodiment of the present invention.

Another method of modeling a signal loss through objects according to the invention is depicted in FIG. 6. In this method, each object is given a permeability value. The object value is then calculated for each object by taking the distance the radial 21 passes through an object and multiplying it by a permeability factor. For example, when the signal travels along radial 21 and passes through the group of trees 22, it travels 30 feet, for example, according to the numbers in the example 61B. The permeability factor for the trees 22 has been defined as two decibels of loss per foot. To calculate the object value for the signal traveling through the trees 22, multiply the distance times the permeability factor to arrive at the loss. Thus, 30 feet times −2 decibels per foot equals a −60 decibel loss.

Correspondingly, when the signal travels through the building 24, the permeability factor for the building 24 denoted by 62B is multiplied by the distance across the building 24 denoted by 62A. Specifically, the total signal loss through the building 24 is 40 feet times −6 decibels per foot for a −240 decibel RSL. Similarly, the cactus 26 object loss is arrived at in the same manner. The signal travels a distance denoted by 63A of 4 feet through an object having a permeability factor denoted by 63B of −4 decibels per foot for a total loss of −16 decibels.

Next, it is necessary to add up the loss for each bin. In this case, it would be −60, −240 and −16 decibels for a total decrease of −316 decibels. It should be noted that the values used in these examples are for illustrative purposes only and do not represent actual data or the range of values that may be found in an actual wireless telecommunications networks.

In addition to the methods shown in FIGS. 5 and 6, it is possible to assign an average or median value for signal loss to each bin in order to estimate the clutter value for each bin. Instead of modeling each clutter object in a bin, a value representing the clutter in each bin is assigned to each bin.

Figure 7:
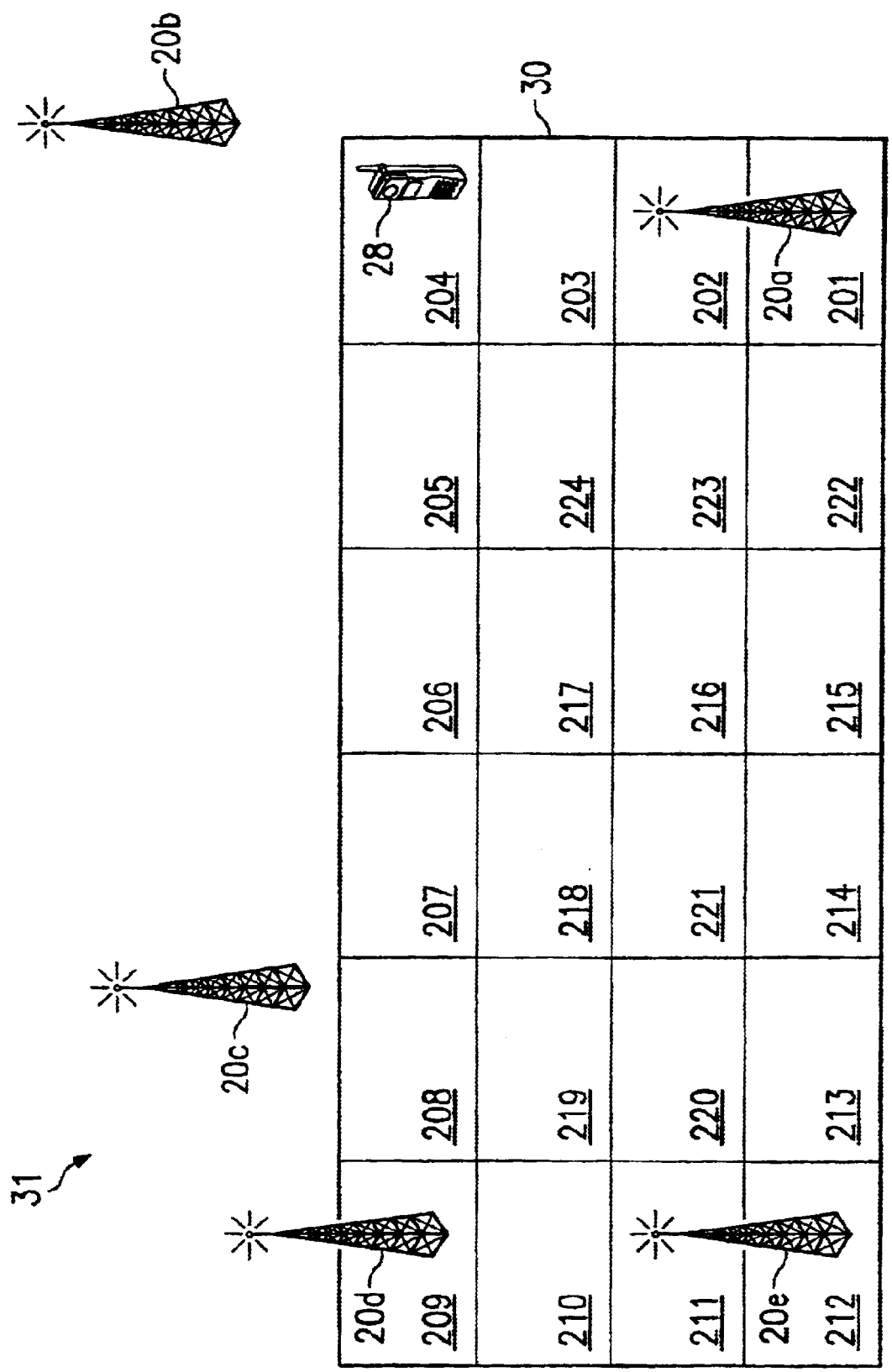
FIG. 7 depicts a matrix of bins used for cumulative clutter calculations based on assigning signal loss values to each bin, according to one embodiment of the present invention.

In order to test the advantages of the cumulative clutter methodology, an experiment was conducted using the matrix of bins 31 shown in FIG. 7. To calculate the RSL for bin 204, being served by base station 20A, one would calculate the path loss between base station 20a and bin 204, and add the cumulative losses associated with bins 202, 203, and 204. The prior art approach is to only apply the clutter loss associated with bin 204.

In order to verify that cumulative clutter is the better approach to determining the path loss and received signal levels, testing was conducted along roadways bounding the 24 bin area shown in FIG. 7, as well as roads encompassing the area. The clutter for each bin was manually determined, trees were found to be the main obstacle to the signals. The trees ranged in height from approximately 20–30 feet to approximately 60–70 feet. Once the clutter types and heights were determined, a clutter database was created, and clutter values were assigned. In order to assign the clutter values, each bin was evaluated by the percentage of the area covered by trees in the bin. If at least 50 percent of a bin was covered by trees, then the clutter value associated with the average tree height was assigned to the bin. It was decided that each of the 24 bins in the testing area needed to be driven separately, locking onto the analog control channel of the server for that particular bin. The best serving base station 20a, 20b, 20c, 20d, 20e for each bin was determined.

Drive-by testing was conducted by slowing down at designated street intersections and stopping to take receive signal level readings. A worst case scenario is produced via Rayleigh (fast) fading, for example, which would take place between 6–10 points inside each of the 24 bins. An average reading would be taken, via a data collection device, and all readings would subsequently be averaged for each bin. This would provide a good approximation of the average received signal level for each bin. These readings could then be compared with received signal levels for each bin server per the propagation prediction model. The received signal levels, representing a cumulative clutter, were calculated, utilizing a standard path loss formula. Clutter values, on a per bin basis, could then be compared directly with those values collected in the field and/or calculated via the prediction model.

After collecting the field data for each bin, the received signal levels are listed along with the received signal level values representing "cumulative clutter" and those receive signal level values derived from the propagation prediction model in Table 1. Column 1 represents the bins shown in FIG. 7. Column 2 represents the RSL values obtained from the propagation prediction model for the bins listed in column 1. In this case, no clutter is assigned to the bins in the model. Column 3 represents the RSL values obtained from the propagation prediction model with only the terminating bin clutter value added to the predicted path loss for the bins listed in column 1. This is representative of the prior art of only accounting for the clutter in the terminating bin 204. Column 4 represents the RSL values obtained from the propagation prediction model for the bins listed in column 1. In this case, clutter values are assigned for all bins 202,203, 204 between the base station 20a and the mobile handset 28 in the terminating bin 204. Column 5 represents the represents the RSL values obtained from the field testing for the bins listed in column 1.

TABLE 1

| 1 BIN | 2 RSL MODEL (NO CLUTTER) | 3 RSL MODEL (WITH CLUTTER) | 4 RSL CUMU-LATIVE | 5 RSL FIELD |
|---|---|---|---|---|
| 1 | N/A | N/A | N/A | N/A |
| 2 | −66 | −70 | −66 | −68 |
| 3 | −73 | −77 | −83 | −81 |
| 4 | −75 | −79 | −96 | −80 |
| 5 | −81 | −85 | −98 | −99 |
| 6 | −79 | −83 | −97 | −94 |
| 7 | −76 | −80 | −91 | −85 |
| 8 | −69 | −72 | −77 | −75 |
| 9 | N/A | N/A | N/A | N/A |
| 10 | N/A | N/A | N/A | N/A |
| 11 | −68 | −70 | −70 | −87 |
| 12 | N/A | N/A | N/A | N/A |
| 13 | −72 | −75 | −76 | −77 |
| 14 | −79 | −83 | −96 | −90 |
| 15 | −72 | −76 | −87 | −82 |
| 16 | −77 | −81 | −91 | −86 |
| 17 | −83 | −87 | −101 | −96 |
| 18 | −80 | −84 | −92 | −91 |
| 19 | −74 | −78 | −79 | −79 |
| 20 | −81 | −85 | −89 | −87 |
| 21 | −81 | −85 | −104 | −103 |
| 22 | −71 | −75 | −74 | −80 |
| 23 | −70 | −74 | −79 | −77 |
| 24 | −72 | −76 | −89 | −89 |

The values associated with bins 201, 209, 210, and 212 were discarded because, as shown in the FIG. 7, the base stations 20a, 20d and 20e are located in bins 201, 209, and 212, respectively. Also, base station 20d is very close to the border between bins 209 and 210. Therefore, results for bin 210 were also discarded. Large variances were noticed in these four bins 201, 209, 210, and 212 between receive signal level values either derived from the model or calculated and the receive signal level values collected in the field.

The average delta between the model predicted RSL (no clutter database) and the field RSL values was determined to be approximately 10 dB as shown in Table 2. It should noted that the delta values, per the chart, can be as much as 20 dB. This, even being a very small representative testing area, points to the fact that accurate clutter databases are essential for areas where noticeable clutter is present.

TABLE 2

| BIN NUMBER | RSL MODEL (dBm) (NO CLUTTER) | RSL FIELD (dBm) | DELTA (dB) |
|---|---|---|---|
| 1 | N/A | N/A | N/A |
| 2 | −66 | −68 | 2 |
| 3 | −73 | −81 | 8 |
| 4 | −75 | −80 | 5 |
| 5 | −81 | −99 | 18 |
| 6 | −79 | −94 | 15 |
| 7 | −76 | −85 | 9 |
| 8 | −69 | −75 | 6 |
| 9 | N/A | N/A | N/A |
| 10 | N/A | N/A | N/A |
| 11 | −68 | −87 | 19 |

TABLE 2-continued

| BIN NUMBER | RSL MODEL (dBm) (NO CLUTTER) | RSL FIELD (dBm) | DELTA (dB) |
|---|---|---|---|
| 12 | N/A | N/A | N/A |
| 13 | −72 | −77 | 5 |
| 14 | −79 | −90 | 11 |
| 15 | −72 | −82 | 10 |
| 16 | −77 | −86 | 9 |
| 17 | −83 | −96 | 13 |
| 18 | −80 | −91 | 11 |
| 19 | −74 | −79 | 5 |
| 20 | −81 | −87 | 6 |
| 21 | −81 | −103 | 22 |
| 22 | −71 | −80 | 9 |
| 23 | −70 | −77 | 7 |
| 24 | −72 | −89 | 17 |
|  |  |  | AVG. 10.35 |

The average delta value between the model predicted RSL with the terminal bin clutter value and the field RSL values was determined to be approximately 7 dB as shown in Table 3.

TABLE 3

| BIN NUMBER | RSL MODEL (dBm) (W/CLUTTER) | RSL FIELD (dBm) | DELTA (dB) |
|---|---|---|---|
| 1 | N/A | N/A | N/A |
| 2 | −70 | −68 | 2 |
| 3 | −77 | −81 | 3 |
| 4 | −79 | −80 | 1 |
| 5 | −85 | −99 | 14 |
| 6 | −83 | −94 | 11 |
| 7 | −80 | −85 | 5 |
| 8 | −72 | −75 | 3 |
| 9 | N/A | N/A | N/A |
| 10 | N/A | N/A | N/A |
| 11 | −70 | −87 | 17 |
| 12 | N/A | N/A | N/A |
| 13 | −75 | −77 | 2 |
| 14 | −83 | −90 | 7 |
| 15 | −76 | −82 | 6 |
| 16 | −81 | −86 | 5 |
| 17 | −87 | −96 | 9 |
| 18 | −84 | −91 | 7 |
| 19 | −78 | −79 | 1 |
| 20 | −85 | −87 | 2 |
| 21 | −85 | −103 | 18 |
| 22 | −75 | −80 | 5 |
| 23 | −74 | −77 | 3 |
| 24 | −76 | −89 | 13 |
|  |  |  | AVG. 6.7 |

The average delta between the collected field RSL and the calculated "cumulative clutter" RSL is approximately 4 dB as shown in Table 4.

TABLE 4

| BIN NUMBER | RSL CUMULATIVE | RSL FIELD (dBm) | DELTA (dB) |
|---|---|---|---|
| 1 | N/A | N/A | N/A |
| 2 | −66 | −68 | 2 |
| 3 | −83 | −81 | 2 |
| 4 | −96 | −80 | 16 |
| 5 | −98 | −99 | 1 |
| 6 | −97 | −94 | 3 |
| 7 | −91 | −85 | 6 |
| 8 | −77 | −75 | 2 |
| 9 | N/A | N/A | N/A |
| 10 | N/A | N/A | N/A |
| 11 | −70 | −87 | 17 |

TABLE 4-continued

| BIN NUMBER | RSL CUMULATIVE | RSL FIELD (dBm) | DELTA (dB) |
|---|---|---|---|
| 12 | N/A | N/A | N/A |
| 13 | −76 | −77 | 1 |
| 14 | −96 | −90 | 6 |
| 15 | −87 | −82 | 5 |
| 16 | −91 | −86 | 5 |
| 17 | −101 | −96 | 5 |
| 18 | −92 | −91 | 1 |
| 19 | −79 | −79 | 0 |
| 20 | −89 | −87 | 2 |
| 21 | −104 | −103 | 1 |
| 22 | −74 | −80 | 6 |
| 23 | −79 | −77 | 2 |
| 24 | −89 | −89 | 0 |
| | | | AVG. 4.1 |

Notice in comparing the individual bin delta values that, in some cases, the numerical difference between delta values is quite large. The results indicate a strong case for moving towards "cumulative clutter" RSL values to assist the propagation prediction models.

FIG. 8 is a flow diagram illustrating process steps for implementing the method and system of the present invention, in accordance with a preferred embodiment, and denoted generally as 70. It can be appreciated by those skilled in the art that FIG. 8, as illustrated and described herein, presents a self-consistent sequence of steps leading to a desired result. The steps are those requiring the physical manipulation of physical quantities. Usually, although not necessarily, these quantities take the form of electrical or magnetic signals capable of being stored, transferred, combined, compared, and otherwise manipulated.

It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "determining," "dividing", "assigning", "applying", "adding", or "calculating", which are commonly associated with mental operations performed by a human operator. No such capability of a human operator is necessary or desirable in most cases of the operations described herein, which form part of the present invention. As indicated herein, these operations are primarily machine operations. Useful machines for performing operations of a preferred embodiment of the present invention include data-processing systems, such as a general-purpose digital computer or other similar devices. In all cases the distinction between the method of operations in operating a computer and the method of computation itself should be borne in mind.

The present invention relates to method steps for processing electrical or other (e.g. mechanical, chemical) physical signals to generate other desired physical signals, and can be implemented via a computer or microcomputer. However, it is not necessary to maintain within a computer memory of a mobile handset 28, or cellular telephone subscriber unit, instructions implementing these method steps. Such instructions can be maintained within a computer memory location of a wireless telephone base station 20 or at a central broadcasting center from which such base stations 20 receive instructions. Implementation of the method described herein is left to the discretion of a particular wireless telephone system designer, whether cellular-based or otherwise.

It can be appreciated by those skilled in the art that the methods described herein can be implemented as a program product (e.g., a control program residing in a computer memory). The program product contains instructions that when executed on a CPU, carry out the operations depicted in the logic flow diagram of FIG. 8. While the present invention is described in the context of a fully functional telecommunications network 10, those skilled in the art will further appreciate that the present invention is capable of being distributed as a program product in a variety of forms. The present invention applies equally, regardless of the particular type of signal-bearing media utilized to actually carry out the distribution. Examples of signal-bearing media include recordable-type media, such as floppy disks, hard-disk drives and CD ROM's, and transmission-type media, such as digital and analog communication links.

Preferred implementations of the invention can include implementations to execute the method or methods described herein as a program product residing in the memory of a microcomputer. Alternatively, a preferred embodiment of the present invention can include a program product residing in a microcomputer memory located at an MSC (e.g., MSC 127 of FIG. 1 herein). The MSC 127 controls system operations in cellular telephone networks, thereby managing calls, tracking billing information, and locating cellular subscribers. The program product thus includes sets of instructions for executing the method and system described herein. Until required by a microcomputer, the set of instructions may be stored as a computer-program product in another computer memory. For example, the set of instructions may be stored as a computer-program product in a disk drive attached to a microcomputer (which may include a removable memory such as an optical disk or floppy disk for eventual use in the disk drive).

The computer-program product can also be stored at another computer and transmitted, when desired, to a user's workstation by an internal or external network. Those skilled in the art will appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

Depicted in FIG. 8 is a flow diagram for the program product program 70. The program uses the following steps: first, determine the bin resolution as noted in step 71. The next step is to determine the path loss radial 21, as performed in step 72. The base station 20 typically has a layout of radials to define direction in relationship to the base station 20, each radial is a known direction and defines the direction the signal is traveling as it propagates to its destination.

In step 73, each bin is populated with the information to describe the objects in each bin. Once the radial 21 has been determined, step 74 identifies the bins along the radial 21 and the associated signal loss. The computer program compares the radial 21 to the objects known to exist in the coverage area 31 and selects the objects which will intersect with the radial 21. Finally, the clutter value for each bin along the radial 21 is added together to create cumulative clutter path loss value in step 76.

FIG. 9 illustrates a method used to model the clutter signal loss as described in FIG. 6. A coverage area 31 is divided into a matrix of bins 30 in step 81, then a length, a width and a height coordinate are assigned to each object in a bin in step 82. Next, a permeability factor is assigned to each object in the bin in step 83. The distance that the radial 21 passes through each object is determined and multiplied by the permeability value of each object to obtain an object value for each object along the radial 21 in step 84.

Next, a clutter value indicating appropriate losses of signal experiences as it propagates through a bin are calculated for each bin in step 85. Finally, step 86 adds all of the clutter values in each bin along the radial 21 to determine the cumulative clutter path loss between a transmitter and a receiver, for example, a base station 20 and a handheld mobile handset 28.

Those skilled in the art can thus appreciate that the invention described herein discloses a method and system, which may take the form of a program product, for optimizing signal strength and interference characteristics in a wireless telecommunications network. By adjusting the signal strength between the transmitter and receiver, interference can be mitigated. The method and system described herein provide an advantage over prior methods by allowing more accuracy. In short, utilizing the method and system described herein results in improvements in the performance of a wireless telecommunications network.

While this invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. In a telecommunications network, a method of determining the cumulative clutter path loss between two points within a coverage area of the network comprising the steps of:
   dividing the coverage area into a geographical matrix of bins;
   for each bin in the matrix, assigning a clutter value by assigning a length, a width, and a height coordinate to objects in each bin of said matrix, said clutter value indicating the appropriate losses a signal experiences as it propagates through the bin; and
   adding the clutter values of bins in the matrix along a radial connecting said two points to determine a cumulative clutter path loss between a transmitter and a receiver situated at said two points.

2. The method according to claim 1 wherein said step of assigning a length, a width, and a height coordinate is followed by the step of applying a permeability value to said objects along the radial.

3. The method according to claim 2 wherein said step of applying a permeability value to said objects is followed by the step of multiplying the distance the radial passes through each of the objects along the radial by the permeability value associated with each object to obtain an object value for each object along the radial.

4. The method according to claim 3 wherein said step of multiplying the distance the radial passes through each of the objects is followed by the step of calculating the clutter value for each bin by summing the object value of each object along the radial within each bin.

5. The method according to claim 1 wherein said step of assigning a clutter value further comprises the step of assigning an object value to each dimension of an object.

6. The method according to claim 5 wherein said step of assigning an object value to each dimension of an object is followed by the step of calculating the clutter value for each bin by summing the object values intersecting said radial.

7. The method according to claim 1 wherein said step of assigning a clutter value further comprises the step of estimating an average clutter value for each bin.

8. In a telecommunications network, a system for determining the cumulative clutter path loss between two points within a coverage area of the network comprising:
   means for dividing the coverage area into a geographical matrix of bins;
   means for assigning a clutter value including a length, a width, and a height coordinate to objects in each bin of said matrix said clutter value indicating the appropriate losses a signal experiences as it propagates through a bin; and
   means for adding the clutter values of bins in the matrix along a radial connecting said two points to determine a cumulative clutter path loss between a transmitter and a receiver situated at said two points.

9. The system according to claim 8 wherein said means for assigning a length, a width, and a height coordinate further comprises a means for applying a permeability value to said objects along the radial.

10. The system according to claim 9 wherein said means for applying a permeability value to said objects further comprises a means for multiplying the distance the radial passes through each of the objects along the radial by the permeability value associated with each object to obtain an object value for each object along the radial.

11. The system according to claim 10 wherein said means for multiplying the distance the radial passes through each of the objects further comprises a means for calculating the clutter value for each bin by summing the object value of each object along the radial within each bin.

12. The system according to claim 8 wherein said means for assigning a clutter value further comprises a means for assigning an object value to each dimension of an object.

13. The system according to claim 12 wherein said means for assigning an object value to each dimension of an object further comprises a means for calculating the clutter value for each bin by summing the object values intersecting said radial.

14. The system according to claim 8 wherein said means for assigning a clutter value comprises a means for estimating an average clutter value for each bin.

15. The system according to claim 8 wherein said transmitter is a mobile handset.

16. The system according to claim 8 wherein said transmitter is a base station.

17. The system according to claim 8 wherein said receiver is a mobile handset.

18. The system according to claim 8 wherein said receiver is a base station.

19. The system according to claim 8 wherein said system is located in a base station.

20. The system according to claim 8 further comprising a means for adjusting signal strength between said transmitter and said receiver using said cumulative clutter path loss.

21. In a telecommunications network, a program product for determining the cumulative clutter path loss between two points within a coverage area of the network comprising:
   instruction means residing in a computer for dividing the coverage area into a geographical matrix of bins;
   instruction means residing in a computer for assigning a clutter value by assigning a length, a width, and a height coordinate to objects in each bin of said matrix said clutter value indicating the appropriate losses a signal experiences as it propagates through the bin; and instruction means residing in a computer for adding the clutter values of bins in the matrix along a radial connecting said two points to determine a cumulative clutter path loss between a transmitter and a receiver situated at said two points.

22. The program product according to claim 21 wherein said instruction means residing in a computer for assigning a length, a width, and a height coordinate further comprises instruction means residing in a computer for applying a permeability value to said objects along the radial.

23. The program product according to claim 22 wherein said instruction means residing in a computer for applying a permeability value to said objects further comprises instruction means residing in a computer for multiplying the distance the radial passes through each of the objects along the radial by the permeability value associated with each object to obtain an object value for each object along the radial.

24. The program product according to claim 23 wherein said instruction means residing in a computer for multiplying the distance the radial passes through each of the objects further comprises instruction means residing in a computer for calculating the clutter value for each bin by summing the object value of each object along the radial within each bin.

25. The program product according to claim 21 wherein said instruction means residing in a computer for assigning a clutter value further comprises instruction means residing in a computer for assigning an object value to each dimension of an object.

26. The program product according to claim 25 wherein said instruction means residing in a computer for assigning an object value to each dimension of an object further comprises instruction means residing in a computer for calculating the clutter value for each bin by summing the object values intersecting said radial.

27. The program product according to claim 21 wherein said instruction means residing in a computer for assigning a clutter value comprises instruction means residing in a computer for estimating an average clutter value for each bin.

* * * * *